United States Patent Office 3,555,061
Patented Jan. 12, 1971

---

3,555,061
1,1,3,3,5,5-HEXA-(TRIFLUOROPROPYL)-TRISILOXANE-1,5 DIOL
Dwain R. Chapman, Midland, Mich., assignor to Dow Corning Corporation, Midland, Mich., a corporation of Michigan
No Drawing. Filed Oct. 21, 1968, Ser. No. 769,418
Int. Cl. C07f 7/08
U.S. Cl. 260—448.2                               1 Claim

ABSTRACT OF THE DISCLOSURE

A fluoroalkylsiloxane compound which exhibits androgen depressant effects. For example, by orally administering a fluoroalkylsiloxane of the formula

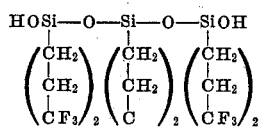

it has been shown that a significant depression of seminal fluid, seminal vesicle, and/or testes weight occurs.

---

This invention relates to a fluoroalkylsiloxane compound and more particularly to a novel fluoroalkylsiloxane compound which can be employed to alter the androgenic capacity of male mammals, e.g., the sex accessory organs of the male (seminal vesicle, prostate) can be reduced in function and/or size.

The fluoroalkylsiloxane of this invention can be used to render a male mammal sterile and can be used in the treatment of prostatic hypertrophy and prostatic carcinoma by depressing androgenic function in males.

This invention relates to a fluoroalkylsiloxane of the formula

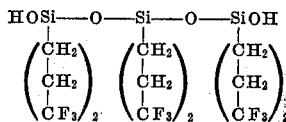

The fluoroalkylsiloxane is prepared by the well known means of hydrolysis. The silane of the formula $$(CF_3CH_2CH_2)_2SiCl_2$$

is added to water (an approximate ratio of 1 to 3 liters of water to 1 mol of silane) at a temperature of about 25° C. to about 50° C. The mixture is then neutralized by washing with water. One can facilitate neutralization by adding an ether or organic solvent such as pentane, hexane, benzene, toluene, and the like. The product mixture is ultimately dried by azeotroping out the water employing a suitable solvent such as toluene or cyclohexane. The solvent is then removed by vacuum and the fluoroalkylsiloxane is obtained.

The fluoroalkylsiloxane compound when administered in a pharmacologically acceptable manner and in a pharmacologically effective amount to male mammals, e.g., rodents, cats, swine, dogs, cattle, deer, fox, and primates (monkeys and man) can alter androgenic functions. The particular alteration of androgenic functions observed include an increase in sex accessory organ function (increased seminal fluid) and size (increased seminal vesicle) with smaller doses and/or a decrease in sex accessory organ function (decreased seminal fluid) and size (decreased seminal vesicle) and a decrease in testicular function (decreased sperm count) with larger doses.

Details regarding mode of administration, dosage, and the like of the fluoroalkylsiloxane to alter androgenic function can be found in U.S. application, Ser. No. 743,602, filed July 10, 1968.

The following examples are illustrative only and should not be construed as limiting the invention which is properly delineated in the appended claims.

EXAMPLE 1

To a 3-necked, 3-liter flask, equipped with an air stirrer, condenser and addition funnel containing 3 liters of water, was added 787 grams (2.66 mol) of $$(CF_3CH_2CH_2)_2SiCl_2$$

The mixture was rapidly stirred at a temperature of 25° to 46° C. for about 1.5 hours. The mixture was continuously washed with water, then stirred, and allowed to settle overnight. After the mixture was neutralized, the water was poured off and the mixture was transferred to a 1-liter flask and rinsed with ether. The product mixture was then dried by azeotroping using 100 ml. of cyclohexane. The solvent was then removed and a 98.5% yield of

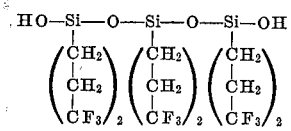

was obtained.

EXAMPLE 2

This example illustrates the structure-activity-relationship between rat androgen-depressant activity and the fluoroalkylsiloxane of this invention.

A group of male rats (Sprague-Dawley strain) were orally dosed with the fluoroalkylsiloxane compound which was diluted in sesame oil. Oral administration was achieved via gastric intubation. The period of dosage was six days at dosage level of 20 mg. per kilogram of body weight. Final body weights were determined in the fasted state just prior to sacrifice. Sacrifice was carried out on day seven. Various organ weights were determined and ratios of the organ weights (grams) to final body weight (grams) were determined for comparison in both control and treated animals.

The table below indicates the structure-activity-relationship referred to above with respect to dosage for effect.

The dosages represent threshold doses for depression of seminal fluid, seminal vesicle, and/or testes weight ratios.

[STRUCTURE-ACTIVITY-RELATIONSHIP BETWEEN ANDROGEN DEPRESSENT ACTIVITY AND THE FLUOROALKYLSILOXANE COMPOUNDS]

| | ADMINISTERED ORALLY | | |
|---|---|---|---|
| | Daily dose, mg./kg. | Number of daily doses | Sacrifice day following first dose | Species |
| Compound:  HO—Si—O—Si—O—Si—OH with (CH₂CH₂CF₃)₂ groups | 20 | 6 | 7 | Rat |

That which is claimed is:
1. The fluoroalkylsiloxane of the formula
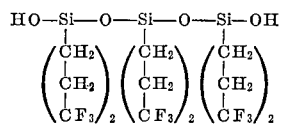
References Cited
UNITED STATES PATENTS
2,915,544  12/1959  Holbrook et al. ____ 260—448.2
TOBIAS E. LEVOW, Primary Examiner
P. F. SHAVER, Assistant Examiner
U.S. Cl. X.R.
424—184